No. 652,920. Patented July 3, 1900.
J. V. PENDER.
EVAPORATING PAN.
(Application filed Apr. 7, 1900.)
(No Model.) 2 Sheets—Sheet 1.
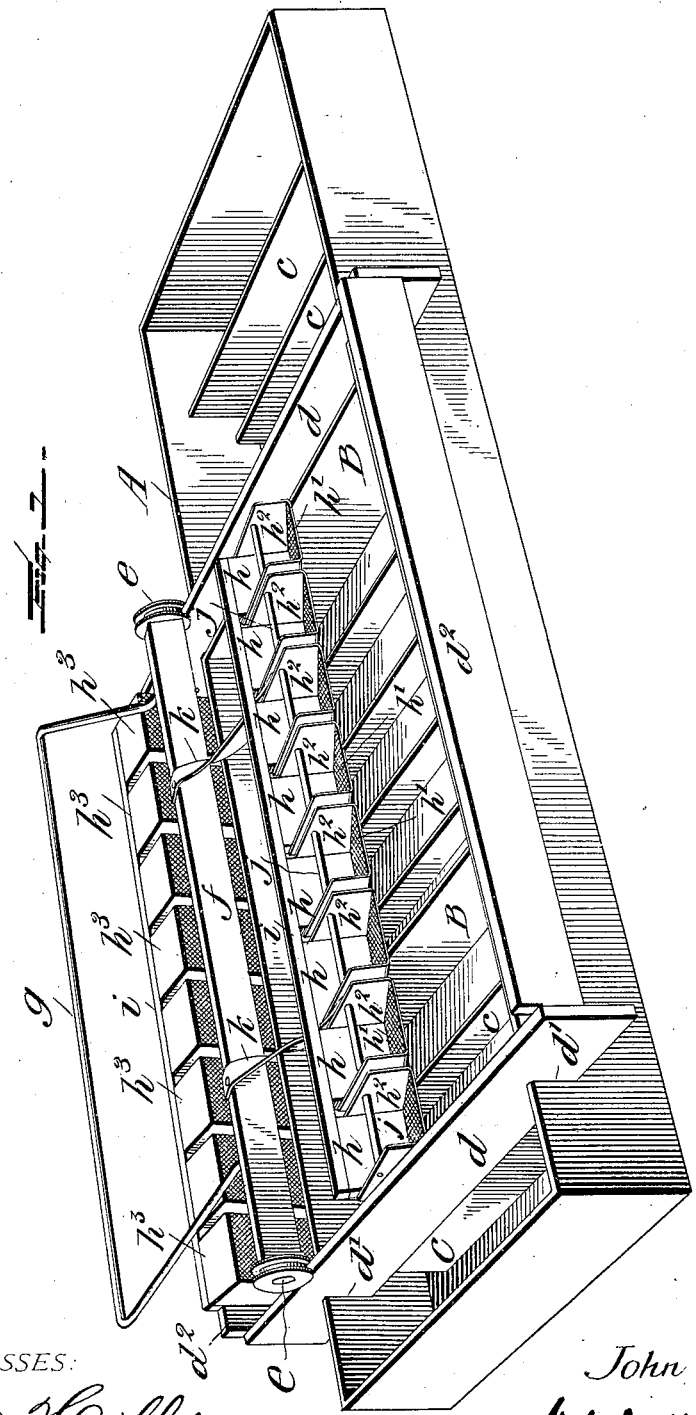
WITNESSES:
L. C. Hills
S. E. Zimmerman
INVENTOR
John V. Pender
BY W. W. Dudley & Co.
Attorneys

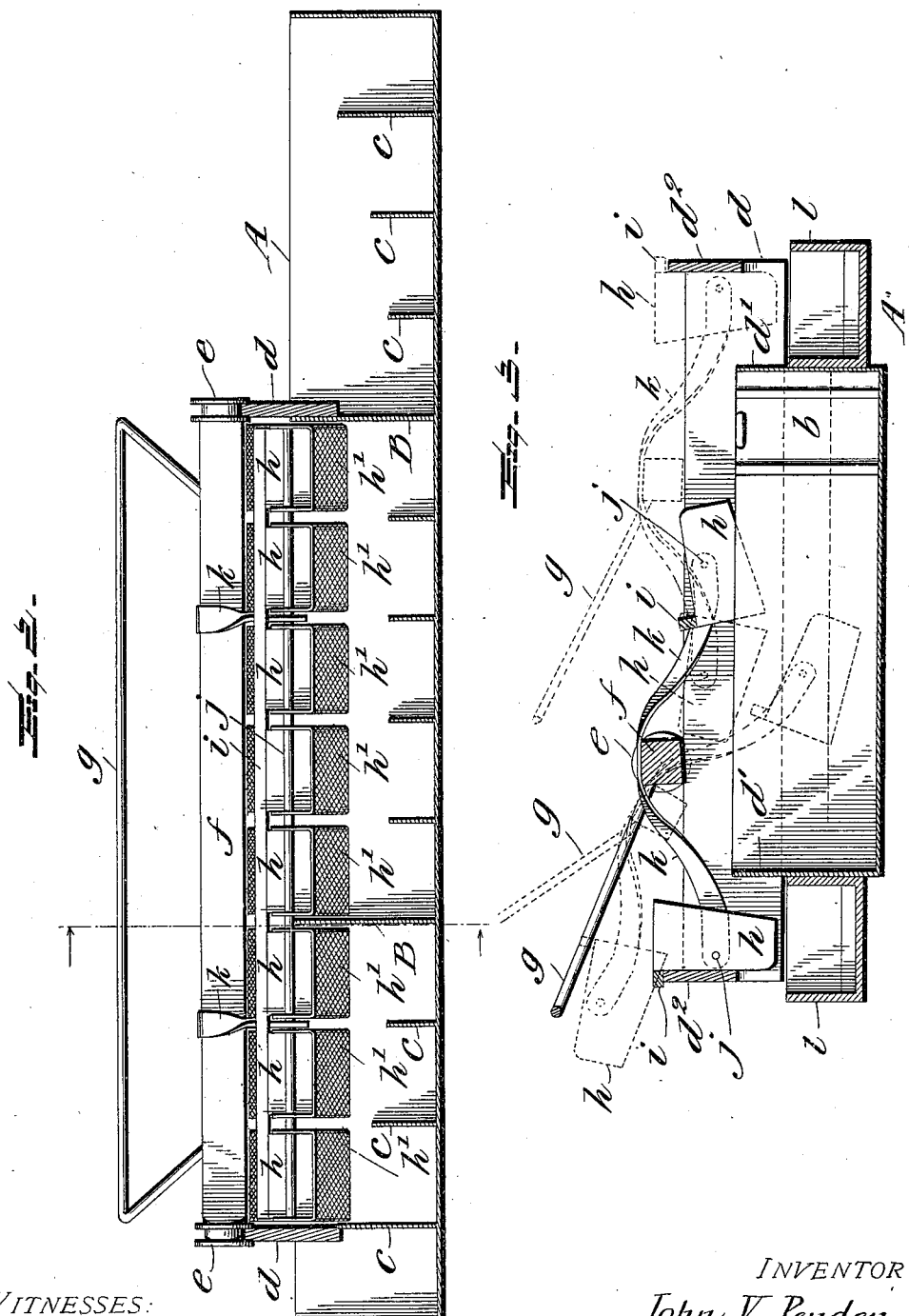

UNITED STATES PATENT OFFICE.

JOHN V. PENDER, OF FAITH, KENTUCKY.

EVAPORATING-PAN.

SPECIFICATION forming part of Letters Patent No. 652,920, dated July 3, 1900.

Application filed April 7, 1900. Serial No. 12,011. (No model.)

*To all whom it may concern:*

Be it known that I, JOHN V. PENDER, a citizen of the United States, residing at Faith, in the county of McLean and State of Kentucky, (whose post-office address is Faith, Kentucky,) have invented certain new and useful Improvements in Evaporators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in appliances appertaining to the evaporation or reduction of cane-juice and the like, the object of the invention being the production of a simple and efficient skimmer adapted for employment more particularly in connection with an evaporating-pan of novel construction, whereby the scum accumulating on the surface of the liquid contained in the pan is readily and quickly removed with the minimum of labor.

The nature of my invention will be readily comprehended by reference to the following detailed description and to the accompanying drawings, in which—

Figure 1 is a view in perspective of an evaporating-pan and skimmer embodying my invention. Fig. 2 is a longitudinal sectional view. Fig. 3 is a transverse sectional view.

Referring to the said drawings by letter, A denotes the evaporating-pan, which is of rectangular form and divided centrally by two transverse partitions B, having an opening toward one end controlled by a slidable gate $b$. These partitions divide the pan into three sections, and the ends are thus made reversible, whereby the life of the pan is doubled. Each end section is provided with a series of transverse partitions $c\ c$, the length of which is less than the width of the pan, and said partitions are disposed alternately or staggered, as shown, whereby the passage of the liquid is circuitous. The partitions of each end section are graduated in height from the outer toward the inner end of the section. This arrangement prevents the syrup from boiling over the partitions and mixing with the untreated liquid.

The skimming device is adapted to be mounted over either section, and it may be manipulated from either side. As a support for the device I provide a rectangular frame comprising side members $d\ d$, which are recessed at $d'\ d'$ to receive the side edges of the pan, and end members $d^2\ d^2$, which connect the side members and extend above the latter, as shown. The side members form rails on which rest and move flanged wheels $e\ e$, said wheels being mounted on the ends of a beam $f$, which forms the support for the skimmers. Secured to the beam is a handle $g$, preferably of the bail type shown. Two gangs of skimmers are employed, one at each side of the beam, the purpose being to skim the sides of the pan alternately in the forward and backward movement of the device. Each skimmer $h$, which is of scoop form, has a perforated bottom $h'$, through which the liquid scooped with the scum filters, imperforate sides $h^2\ h^2$, and an imperforate relatively-heavy back $h^3$, which extends slightly above the sides. All of the skimmers of one gang are connected at their rear end by a bar $i$ and centrally by a rod $j$, the bar being preferably secured to the upper ends of the back pieces $h^3$, while the rod passes transversely through all of the sides $h^2$. In this manner all of the skimmers are rigidly secured together and move in unison. From each side of the beam $f$ there projects a plurality of arms $k\ k$, which extend between certain of the skimmers and have in their ends apertures which receive the rod $j$. The skimmers are thus pivotally hung on the rod, and the weight of the gang is so distributed that the rear end overbalances the front end, the result being that the front ends or mouths of the skimmers are presented to the liquid in their forward movement.

In operation one gang of skimmers is carried to the center of the pan and partially submerged in the liquid, and the device is then drawn forward, the skimmers being kept down in the pan between the partitions until the edge or gunwale of the pan is reached, when the skimmers are elevated sufficiently to clear the edge and are carried against the frame-bar $d^2$, and as the point of contact of the skimmers with the bar is below the rod $j$ further movement causes the gang to tilt and become inverted, in which position the contained scum is discharged outside of the pan and preferably in a trough, such as $l$. The elevation of the filled skimmers causes the depression of the gang of empty skimmers, and in the return movement of the device the skimming takes place at the other side, and so on until the operation is complete. It will be understood that by reason of the weighted inner side of the skimmers they are automatically righted after leaving the rod, so that the manual labor is confined to the reciprocation of the device. The skimmers of each gang are separated from each other sufficiently to accommodate the partitions, as will be understood.

I claim as my invention—

1. An evaporator, comprising an evaporating-pan divided into sections by a partition having a controllable opening, each section having partitions of gradually-reduced depth, guide-rails above the pan, a skimming device comprising a beam carrying wheels which move on the rails, arms extending at the side of the beam, a rod passed through the end of the arms, a gang of skimmers pivotally hung on the rod and weighted at their inner ends and means at the side of the pan in the path of the skimmers operating at the end of the movement of the latter to tilt the skimmers in the manner substantially as described.

2. In combination, an evaporating-pan, guide-rails above the pan, bars at the ends of the rails, and a double skimming device comprising a beam carrying wheels which move on the rails, arms extending at each side of the beam, rods passed through the ends of the arms, a gang of skimmers pivotally hung on each rod and weighted at their inner ends, said skimmers adapted to alternately contact with and be tilted by the bars in the manner substantially as described.

In testimony whereof I affix my signature in presence of two witnesses.

JOHN V. PENDER.

Witnesses:
GEORGE ARNOLD,
C. E. ELLIS.